United States Patent [19]
Berman

[11] Patent Number: 5,850,348
[45] Date of Patent: Dec. 15, 1998

[54] AUTOMATED CIRCUIT DESIGN CASE MANAGEMENT

[75] Inventor: Charles Berman, Moorpark, Calif.

[73] Assignee: Viewlogic Systems, Inc., Marlboro, Mass.

[21] Appl. No.: 644,618

[22] Filed: May 1, 1996

[51] Int. Cl.$^6$ .............................. G06F 17/50; G06F 17/30
[52] U.S. Cl. .................... 364/488; 364/489; 364/578; 364/490; 707/203; 707/511
[58] Field of Search .................................... 364/488–491, 364/500, 619, 600, 578; 395/500, 619, 600; 707/203, 511

[56] References Cited

U.S. PATENT DOCUMENTS

| | | | |
|---|---|---|---|
| 4,558,413 | 12/1985 | Schmidt et al. | 364/300 |
| 5,111,413 | 5/1992 | Lazansky et al. | 364/578 |
| 5,301,318 | 4/1994 | Mittal | 395/600 |
| 5,355,476 | 10/1994 | Fukumura | 395/600 |
| 5,359,523 | 10/1994 | Talbott et al. | 364/468 |
| 5,418,728 | 5/1995 | Yada | 364/468 |
| 5,436,849 | 7/1995 | Drumm | 364/490 |
| 5,535,386 | 7/1996 | Wang | 395/600 |
| 5,555,199 | 9/1996 | Cunningham et al. | 364/578 |
| 5,623,418 | 4/1997 | Rostoker et al. | 364/489 |
| 5,634,056 | 5/1997 | Casotto | 395/619 |

OTHER PUBLICATIONS

Smith et al. ("FACE Core Environment: The Model and its Application in CAE/CAD Tool Development", 26th ACM/IEEE Design Automation Conference, Jan. 1, 1989, pp. 446–471).

Scheckler et al. ("A utility–based integrated system for process simulation", IEEE Transactions on Computer–Aided Design of Integrated Circuits and Systems, vol. 11, No. 7, Jul. 1992, pp. 911–920).

Mi et al. ("Process integration in CASE environments", IEEE Software, vol. 9, No. 2, pp. 45–53, Mar. 1992).

Wasserman ("CASE Environments for Design Automation", 1989 DAC, Jan. 1989, pp. 193–196).

Bosua et al. ("Realisation of an integrated software engineering environment through heterogeneous CASE–tool integration", IEEE Comput. Soc. Press, Proceedings of the 1995 Software Engineering Environments, Apr. 5, 1995, pp. 152–159).

Brown ("Why Evaluating CASE Environments is Different from Evaluating CASE Tools", IEEE, 1994 Symposium of Assessment of Quality Software Development Tools, Jan. 1994, pp. 4–13).

Primary Examiner—Kevin J. Teska
Assistant Examiner—Phallaka Kik
Attorney, Agent, or Firm—D'Alessandro & Ritchie

[57] ABSTRACT

The invention provides a method and system for automated circuit design case management. A computer system maintains a set of cases for circuit design, in which each case comprises a set of files, in one or more directories, representing the circuit design. For example, each case may comprise a circuit schematic, a symbolic representation for a circuit element, a set of timing information, or a wiring diagram. The system provides a set of tools for automated management, manipulation, and verification of cases. The system provides a technique by which a designer or other user may create a case in which the program maintains assertions regarding the state of the circuit, the mode of operation, or the purpose of analysis for that case. The system provides a technique by which a designer or other user may modify a first case, or create a second case modeled on the first case, in which a first subset of the files for each case is invariant and a second subset of the files differ between the two cases. The system provides links provided between the first case and the second case for those files which are invariant, so as to provide for simultaneous modification of multiple cases and to provide for simultaneous analysis of multiple cases.

32 Claims, 14 Drawing Sheets

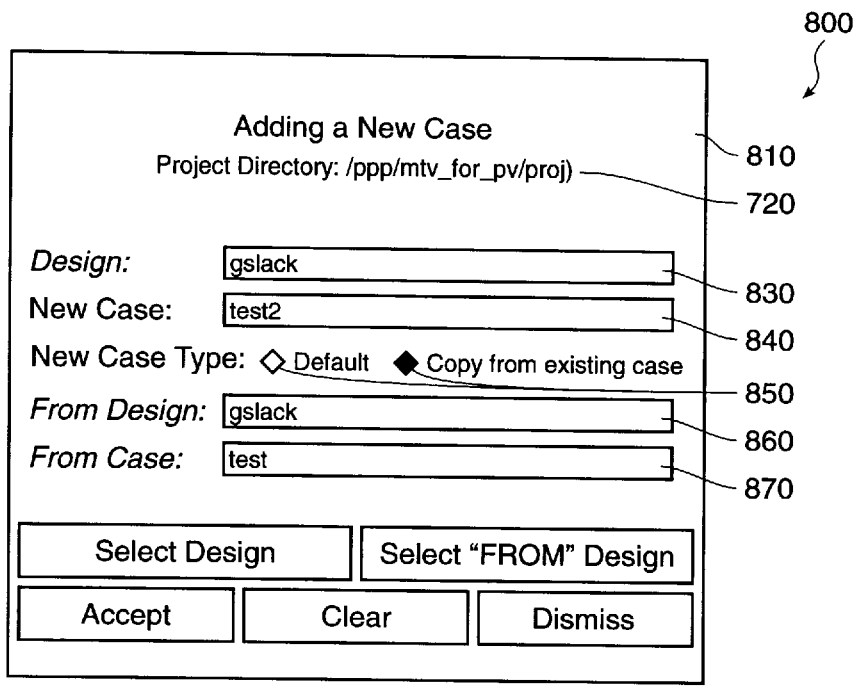
WINDOW TO ADD A NEW CASE
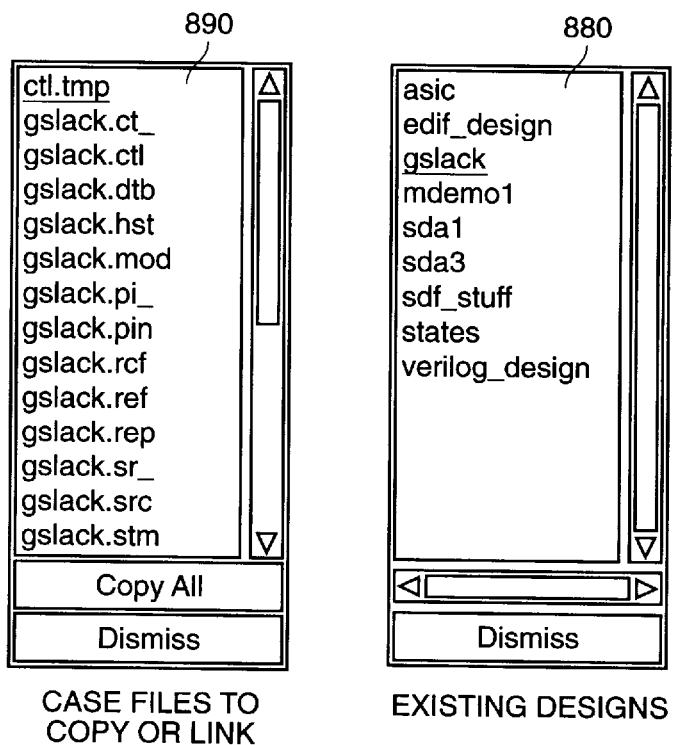
CASE FILES TO COPY OR LINK
EXISTING DESIGNS
*FIG. 8*

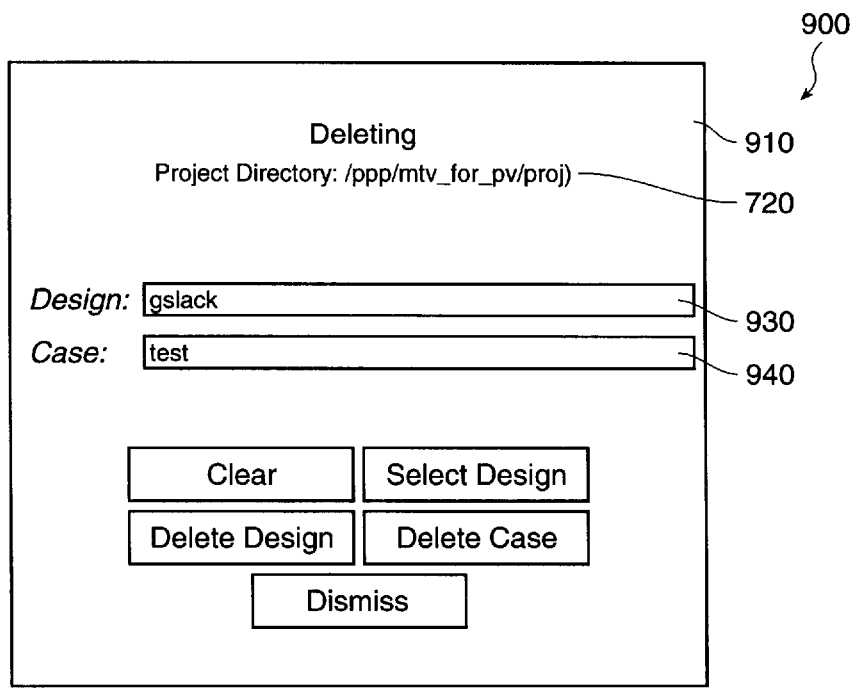
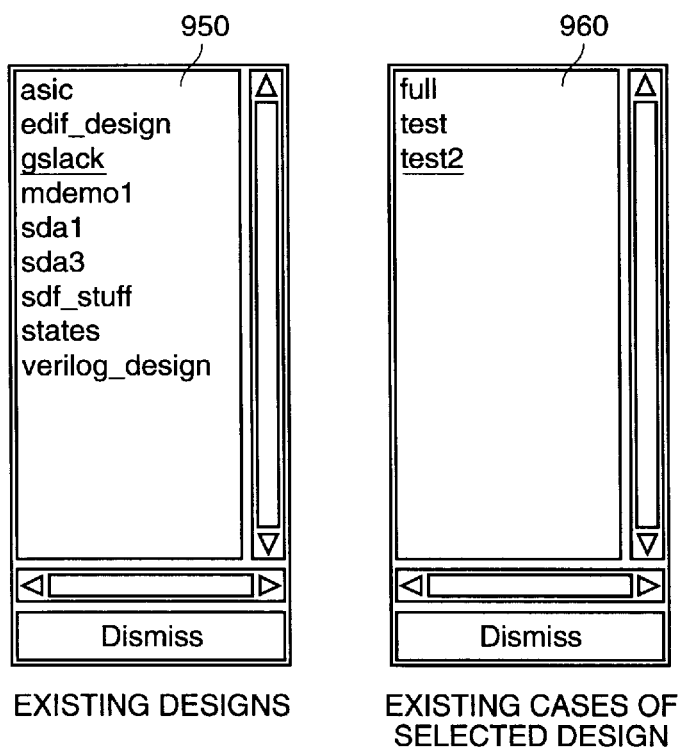
WINDOW TO DELETE AN ENTIRE DESIGN OR CASE
EXISTING DESIGNS
EXISTING CASES OF SELECTED DESIGN
FIG. 9

Viewdraw Netlist Parameters

Project Directory: /ppp/mtv_for_pv/proj)

| | | | |
|---|---|---|---|
| Design Name (Required): | gslack | Reset | Clear |
| Case Name (Required): | test | Reset | Clear |
| Destination (Required): | ◆ Analysis Case Name   ◇ Explicit Pathname | | |
| Output Files to Generate: | ■ (.ctl)  ■ (.mod)  ■ (.pin)  □ (.tem)  □ (.idd) | | |
| Level Attributes: | | Reset | Clear |
| Component ID Attribute: | | Reset | Clear |
| Pin ID Attribute: | | Reset | Clear |
| Model ID Attribute | | Reset | Clear |
| Timing Library List File: | library.lst  Select  Browse | Reset | Clear |
| ASIC DTB File: | Select  Browse | Reset | Clear |
| Primitives File: | Select  Browse | Reset | Clear |
| Model Mapping File: | Select  Browse | Reset | Clear |
| | | Reset | Clear |
| Additional VTM or MMP options: | | Reset | Clear |
| | | Reset | Clear |

| Accept | Initialize | Clear | Dismiss | Select Design |

*FIG. 10*

EDIF Netlist Parameters
Project Directory: /ppp/mtv_for_pv/proj)

| Field | Value | | | |
|---|---|---|---|---|
| Design Name (Required): | gslack | | Reset | Clear |
| Case Name (Required): | test | | Reset | Clear |
| EDIF File (Required): | | Select Browse | Reset | Clear |

| | | | |
|---|---|---|---|
| Top-Level Design to Use: | | Reset | Clear |
| Case Sensitive Data: | ◆ Lower ◇ Keep | ◇ Upper | |
| Flattening of Cells: | ◆ Enabled | ◇ Disabled | |
| Verbose Messages: | ◇ Enabled | ◆ Disabled | |
| List Designs/Libraries/Views in EDIF File: | ◇ Enabled | ◆ Disabled | |
| Print Interpreted Contents of EDIF File: | ◇ Enabled | ◆ Disabled | |
| Display All Properties & Generate qnf2pin.ini: | ◇ Enabled | ◆ Disabled | |
| Divide Properties by 10 (if above Enabled): | ◇ Enabled | ◆ Disabled | |
| Use the Designator String as the Port Definition: | ◇ Enabled | ◆ Disabled | |
| Generate a MOTIVE .pin file in addition to a .qnf file: | ◆ Enabled | ◇ Disabled | |
| Set of Names to Read from EDIF: | ◆ Enabled | ◇ Disabled | |

| Field | | | | |
|---|---|---|---|---|
| File of Specified Attributes: | | Select Browse | Reset | Clear |
| Flattened Instance Name Separator: | | | Reset | Clear |
| Strip Character from QNF/PIN File: | ☐ | | Reset | Clear |
| Stop Netlisting at Instance of Cell: | | | Reset | Clear |
| Prefix Internal Name with String: | | | Reset | Clear |
| Specify Units Per Inch (default 1000): | | | Reset | Clear |

| Accept | Initialize | Clear | Dismiss | Select Design |
|---|---|---|---|---|

*FIG. 11*

Verilog Netlist Parameters
Project Directory: /ppp/mtv_for_pv/proj

| Field | Value | | | | |
|---|---|---|---|---|---|
| Design Name (Required): | verilog_design | | | Reset | Clear |
| Case Name (Required): | x10–x19 | | | Reset | Clear |
| Verilog File(s) (Required): | x10.v | Select | Browse | Reset | Clear |

Modules to be Non-Flattened in Files: [ ] Reset Clear

Modules to be Flattened in Files: [ ] Reset Clear

After Translation, Rename From: [ ] Select Browse Reset Clear

After Translation, Rename To: [ ] Select Browse Reset Clear

Verbose Messages:  ◇ Enabled  ◆ Disabled
Skip over Behavioral Construct:  ◇ Enabled  ◆ Disabled
Process Hierarchically:  ◇ Enabled  ◆ Disabled Single Character Hierarchy Separator: [ ]  Reset  Clear File of Non-Flattened Modules: [ ]  Reset  Clear Starting Processing Point Module: [ ]  Reset  Clear Multi-Bit Port Format String: %s %d  Reset  Clear

| Accept | Initialize | Clear | Dismiss | Select Design |

QNF Netlist Parameters
Project Directory: /ppp/mtv_for_pv/proj)

| Field | Value | | | | |
|---|---|---|---|---|---|
| Design Name (Required): | gslack | | | Reset | Clear |
| Case Name (Required): | test | | | Reset | Clear |
| QNF File (Required): | | Select | Browse | Reset | Clear |

| | | |
|---|---|---|
| Verbose Messages: | ◇ Enabled | ◆ Disabled |
| Write debug QNF file qnf2pin.qnf: | ◇ Enabled | ◆ Disabled |
| Generate MMP Initial Control File: | ◇ Enabled | ◆ Disabled |

| Field | | | | | |
|---|---|---|---|---|---|
| Output PIN Filename: | | Select | Browse | Reset | Clear |
| MOTIVE XY Filename: | | Select | Browse | Reset | Clear |
| PDQ Placement (.pos) Filename: | | Select | Browse | Reset | Clear |
| Design Name File Prefix: | | | | Reset | Clear |
| Maximum Error Message Threshold: | | | | Reset | Clear |

| Accept | Initialize | Clear | Dismiss | Select Design |

AUTOMATED CIRCUIT DESIGN CASE MANAGEMENT

BACKGROUND OF THE INVENTION

1. Field of the Invention

This invention relates to automated circuit design case management.

2. Description of Related Art

Systems for automated circuit design or testing commonly generate and use large numbers of data files, including files which specify circuit schematics, symbolic representations for circuit elements, timing information, and wiring diagrams. These data files are typically stored in a computer storage system and accessed by application software for circuit design. One example application for circuit design is the "Motive" product available from Viewlogic Systems, Inc., of Marlboro, Mass.

One problem which has arisen in the art is that management of those data files is complex and prone to error, particularly in the event there are multiple versions of a particular design. For example, a design for a printed circuit board might be instantiated in a first version having a minimum allocated space, a second version having a typical allocated space, and a third version having a maximum allocated space. It sometimes occurs that designers wish to generate and test each of these separate versions, either to compare them for suitability or to make them separately available for differing applications.

The complexity of managing multiple versions is exacerbated by the increased automation and complexity of circuit design tools. Files are often generated or used by these tools without seeking approval from a designer or other user and without informing the designer or other user, often are assigned cryptic and non-mnemonic names, and often are placed in obscure and non-mnemonic directories or other locations. The designer or other user seeking to manage multiple design versions is therefore subjected to the task of determining which files are associated with which versions, which files are different for differing versions, and whether particular files are required or optional for particular versions.

Accordingly, it would be advantageous to provide a superior technique for automated circuit design management of multiple versions (herein called "cases"). It would be particularly advantageous to provide a technique for automated circuit design case management which automates the processes for creating cases, modifying cases, comparing cases, and deleting cases.

SUMMARY OF THE INVENTION

The invention provides a method and system for automated circuit design case management. A computer system maintains a set of cases for circuit design, in which each case comprises a set of files, in one or more directories, representing the circuit design. For example, each case may comprise a circuit schematic, a symbolic representation for a circuit element, a set of timing information, or a wiring diagram. The system provides a set of tools for automated management, manipulation, and verification of cases.

The system provides a technique by which a designer or other user may create a case in which the program maintains assertions regarding the state of the circuit, the mode of operation, or the purpose of analysis for that case. The system provides a technique by which a designer or other user may modify a first case, or create a second case modeled on the first case, in which a first subset of the files for each case is invariant and a second subset of the files differ between the two cases. The system provides links provided between the first case and the second case for those files which are invariant, so as to provide for simultaneous modification of multiple cases and to provide for simultaneous analysis of multiple cases.

BRIEF DESCRIPTION OF THE DRAWINGS

FIG. 8 shows a display for selecting a new case.

FIG. 9 shows a display for deleting a design or a case.

FIG. 10 shows a display for a netlister tool for ViewDraw data.

FIG. 11 shows a display for a netlister tool for EDF data.

FIG. 12 shows a display for a netlister tool for Verilog data.

FIG. 13 shows a display for a netlister tool for QNF data.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

In particular, the preferred embodiment is described with reference to particular products and data formats, including the "Motive" product available from Viewlogic Systems, Inc., and data structures used therewith, the "EDIF" data structure, the "Verilog" data structure, and the "QNF" data structure. This product and these data structures are known in the art of automated circuit design and analysis.

In a preferred embodiment, the system for automated circuit design case managment is implemented using a general-purpose processor having program and data memory, mass storage, and input/output devices including a keyboard, mouse or other pointing device, and display monitor. The processor is preferably a SPARC 20 processor operating under control of the SunOS 4.1.3 operating system; and controlling an X terminal which operates as the input/output device. However, in alternative embodiments, other general-purpose processors, other operating systems, and other input/output devices would be workable, and are within the scope and spirit of the invention.

System for Automated Circuit Design Case Management

Figure 1:
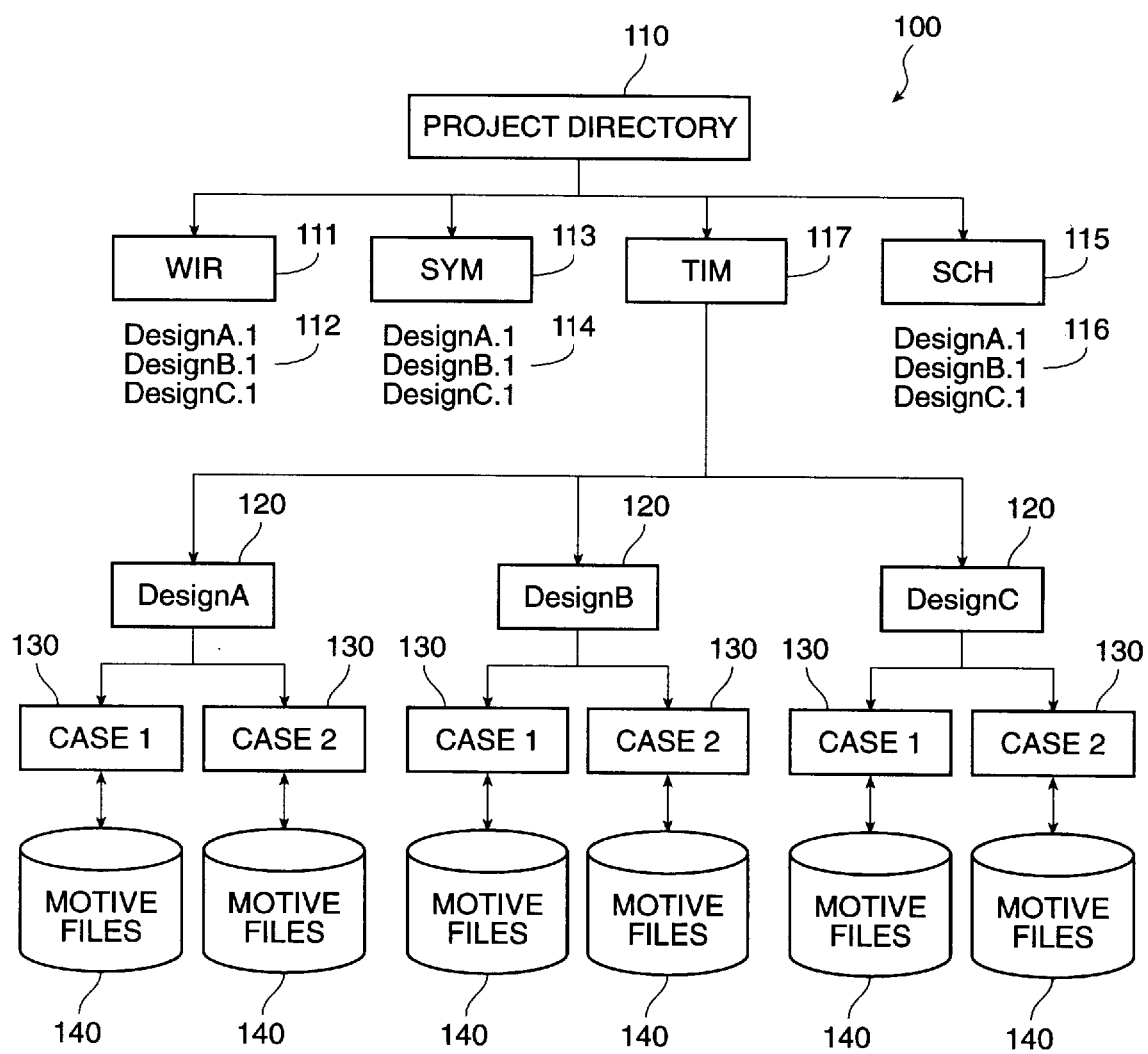
FIG. 1 shows a block diagram of an arrangement of directories and files for automated circuit design case management.

FIG. 1 shows a block diagram of an arrangement of directories and files for automated circuit design case management.

A directory structure 100 comprises a project directory 110, which serves as a root of a subtree of directories in which files relating to particular designs, and to cases within those designs, are stored.

A WIR directory 111 comprises a set of schematic wire files 112, one for each design.

A SYM directory 113 comprises a set of symbol table files 114, one for each design.

A SCH directory 115 comprises a set of schematic files 116, one for each design.

A TIM directory 117, for timing information, comprises a set of design subdirectories 120, one for each design. Thus for example, there might be a "DesignA" subdirectory 120 for a first design, a "DesignB" subdirectory 120 for a second design, and a "DesignC" subdirectory 120 for a third design.

Each design subdirectory 120 comprises a set of case subdirectories 130, one for each case for the design. Thus for example, there might be a "Case1" subdirectory 130 for a first case for Design A and a "Case2" subdirectory 130 for a second case for Design A.

Each case subdirectory 130 comprises a set of case files 140. These case files 140 include all files necessary for timing analysis of the particular case.

Figure 2:
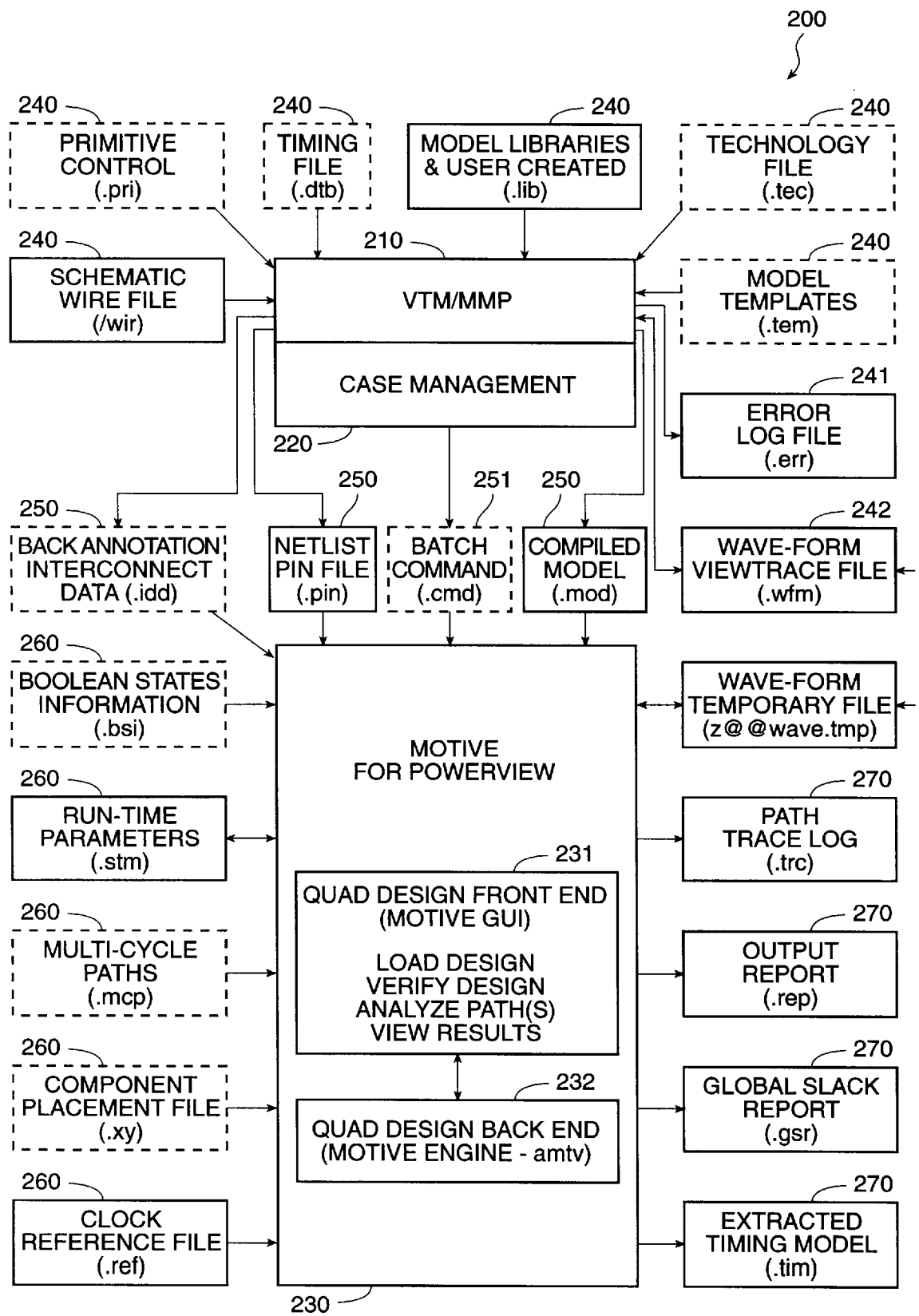
FIG. 2 shows a data flow diagram of a method for automated circuit design case management.

FIG. 2 shows a data flow diagram of a method for automated circuit design case management.

A system 200 for automated circuit design case management comprises a model preprocessor 210, a case management module 220, and a set of circuit design tools 230.

The model preprocessor 210 receives a set of information files 240 regarding a case to be processed, including the schematic wire files 112 (/wir), a set of primitive control files (.pri), a set of timing files (.dtb), a set of library files (.lib), a set of technology files (.tec), and a set of model templates (.tem).

In response thereto, the model preprocessor 210 generates an error log file 241 (.err), a wave-form file 242 (.wfm), and a set of preprocessed input files 250 to be passed to the circuit design tools 230, including a back annotation file (.idd), a netlist pin file (.pin), and a compiled model file (.mod).

The case management module 220 generates a batch command file 251 (.cmd) to be passed to the circuit design tools 230, comprising a set of batch commands for manipulating the case files 140.

The circuit design tools 230 receive the preprocessed input files 250, as well as a set of additional input files 260, including a boolean states information file (.bsi), a run-time parameters file (.stm), a multi-cycle paths file (.mcp), a component placement file (.xy), and a clock reference file (.ref).

In response thereto, the circuit design tools 230 generate a set of output files 270, including a path trace log (.trc), an output report (.rep), a global slack report (.gsr), and an extracted timing model file (.tim). The circuit design tools 230 may also generate one or more temporary files 280, and may alter one or more preprocessed input files 260 or additional input files 270, such as the run-time parameters file.

In a preferred embodiment, the circuit design tools 230 comprise a graphical user interface 231 and a circuit design tool engine 232. The graphical user interface 231 is used as a front end for a designer or other user to input commands to, and view outputs from, the circuit design tool engine 232. The graphical user interface 231 provides commands for, and the circuit design tool engine 232 provides tools for, various analysis functions, including loading designs into the circuit design tool engine 232, verifying designs, analyzing paths within those designs, and viewing results of analysis for those designs.

In a preferred embodiment, the graphical user interface 231 and the circuit design tool engine 232 comprise those available with the "Motive" product, available from Viewlogic Systems, Inc., of Marlboro, Mass. The particular formats of files used by and with this product are known in the art.

Figure 3:
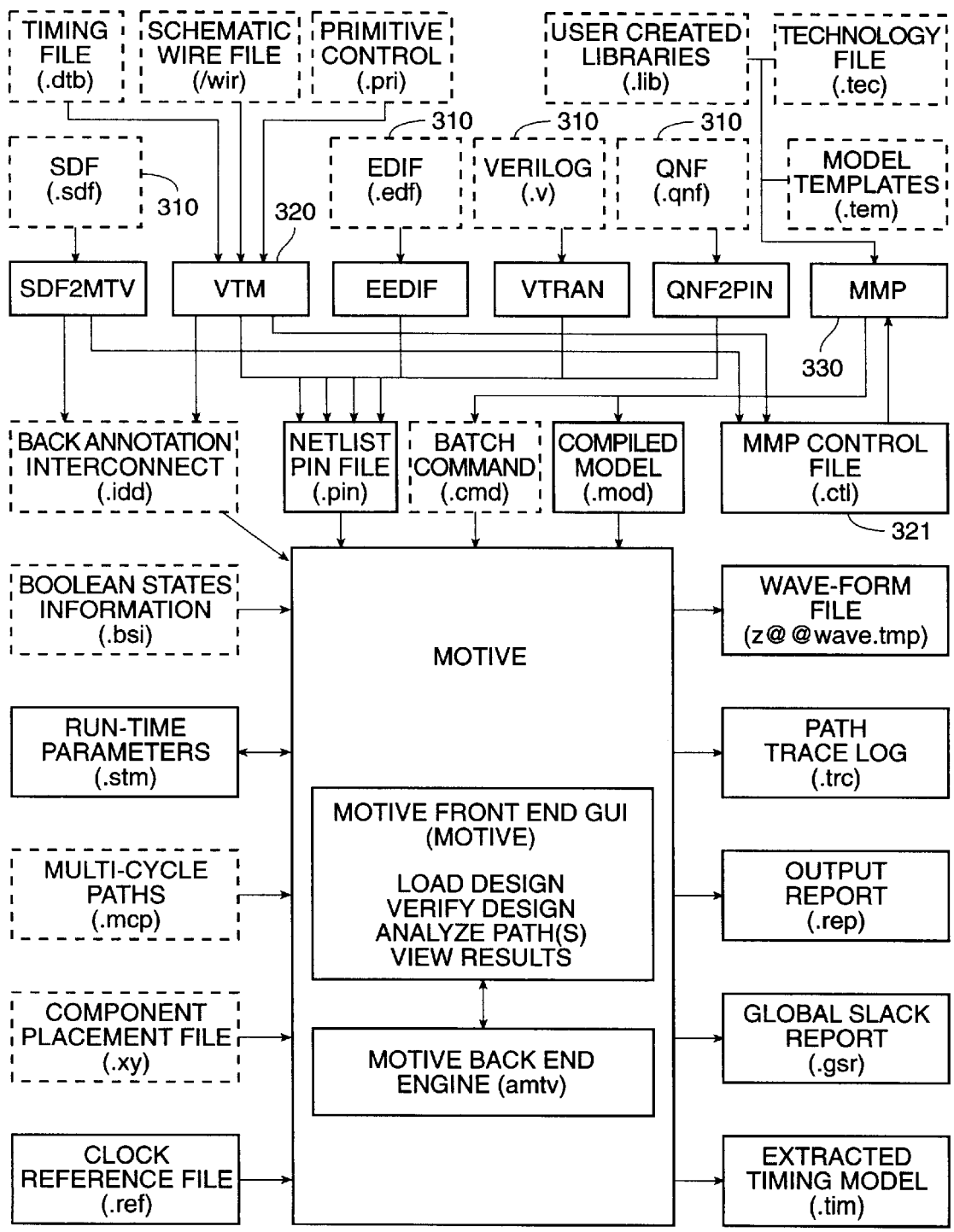
FIG. 3 shows a data flow diagram of a method for automated circuit design case management.

FIG. 3 shows a data flow diagram of a method for automated circuit design case management.

The model preprocessor 210 includes a set of format translator modules 310 which translate input files into a standardized format to be used by the circuit design tools 230. These format translator modules 310 include an SDF2MTV module, which translates from SDF format (.sdf), an EEDIF module, which translates from the EDIF format (.edf), a VTRAN module, which translates from the Verilog format (.v), and a QNF2PIN module, which translates from the QNF format (.qnf). These particular formats of files are known in the art.

The model preprocessor 210 includes a VTM module 320, which receives the schematic wire files 112, timing files (.dtb), and primitive control files (.pri). In response thereto, the VTM module 320, in combination with one or more of the translator modules 310, generates the back annotation file (.idd), the netlist pin file (.pin), and an MMP control file 321 (.ctl).

The case management module 220 includes an MMP module 330 which receives the library files (.lib), the technology files (.tec), the model templates (.tem), and the MMP control file 321 (.ctl). In response thereto, the MMP module 330 generates the batch command file 251 (.cmd) and the compiled model file (.mod).

Figure 4:
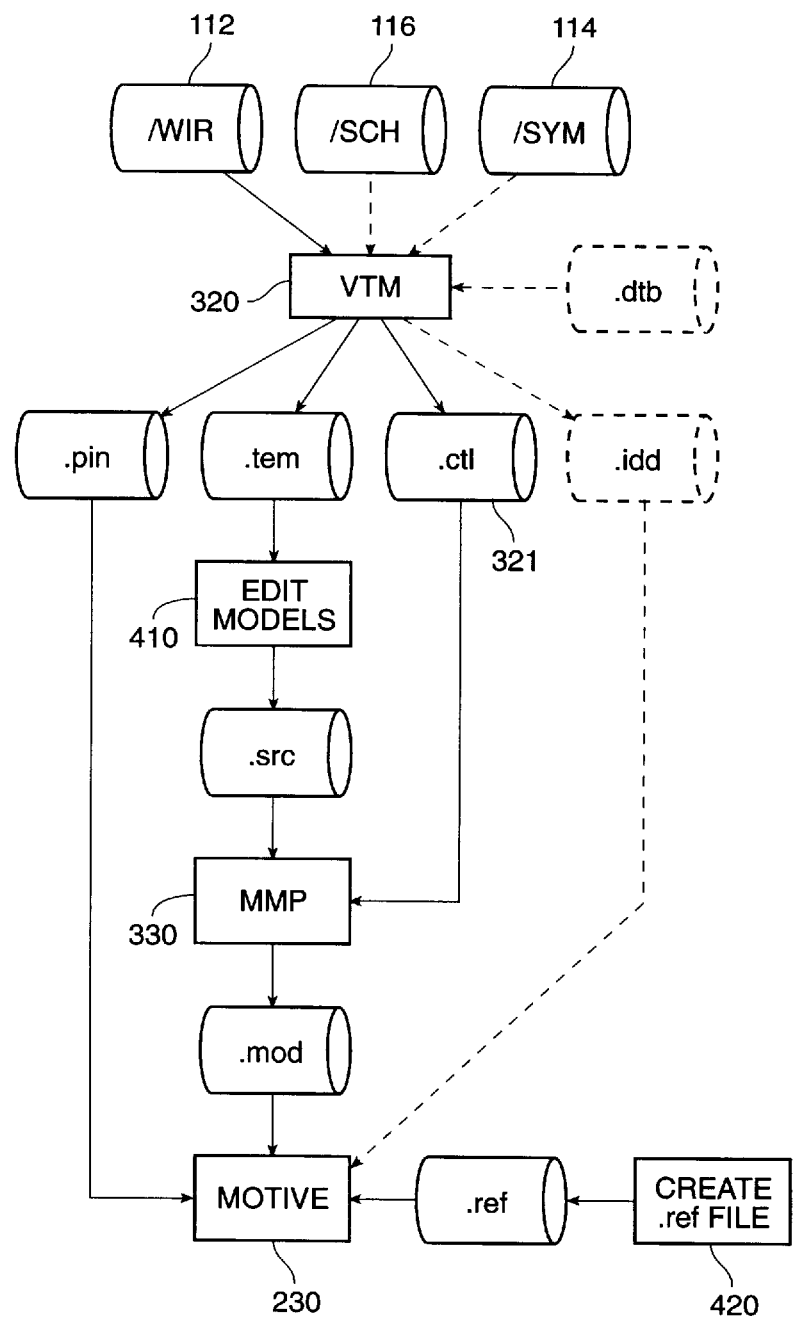
FIG. 4 shows a data flow diagram for ViewDraw data in a method for automated circuit design case management.

FIG. 4 shows a data flow diagram for ViewDraw data in a method for automated circuit design case management.

When processing data in the ViewDraw format, the VTM module 320 receives the schematic wire files 112 (/wir) in the WIR directory 111, the symbol table files 114 (/sym) in the SYM directory 113, the schematic files 116 (/sch) in the SCH directory 115, and the timing files (.dtb). In response thereto, the VTM module 320 generates the back annotation file (.idd), the netlist pin file (.pin), the model templates (.tem), and the MMP control file 321 (.ctl).

The designer or other user may edit the model templates (.tem) using a model editing tool 410, so as to adjust the model templates (.tem) for a particular case or otherwise, and so as to produce an MMP source file (.src).

The MMP module 330 receives the MMP control file 321 (.ctl) and the MMP source file (.src). In response thereto, the MMP module 330 generates the compiled model file (.mod).

The designer or other user may create the clock reference file (.ref) using a reference editing tool 420, so as to produce the clock reference file (.ref).

The circuit design tools 230 (preferably the "Motive" product), receive the back annotation file (.idd), the netlist pin file (.pin), the compiled model file (.mod), and the clock reference file (.ref), and operate to analyse the circuit. In a preferred embodiment, the circuit design tools 230 operate interactively with the designer or other user to provide information about the circuit and other forms of analysis to the designer or other user.

Figure 5:
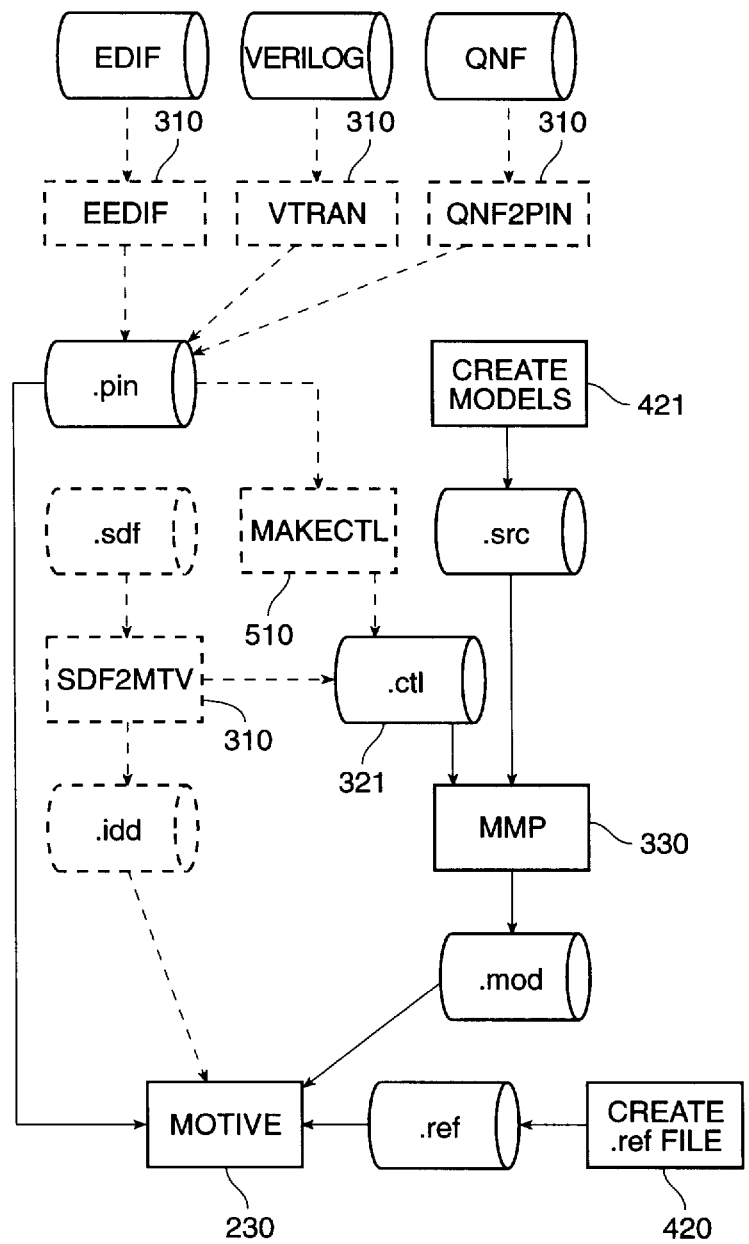
FIG. 5 shows a data flow diagram for other data in a method for automated circuit design case management.

FIG. 5 shows a data flow diagram for other data in a method for automated circuit design case management.

When processing data in other than the ViewDraw format, one of the format translator modules 310 receives data in a particular format and translates that data into the netlist pin file (.pin). For example, the EEDIF module translates from the EDIF format (.edf), the VTRAN module translates from the Verilog format (.v), or the QNF2PIN module translates from the QNF format (.qnf). The SDF2MTV module receives translates from the SDF format (.sdf), and in response thereto, generates the back annotation file (.idd).

A MAKECTL module 510 receives the netlist pin file (.pin), in conjunction with the SDF2MTV module, generates the MMP control file 321 (.ctl).

The MMP module 330 receives the MMP control file 321 (.ctl) and the MMP source file (.src). In response thereto, the MMP module 330 generates the compiled model file (.mod).

The designer or other user may create the clock reference file (.ref) using a reference editing tool 420, so as to produce the clock reference file (.ref).

The circuit design tools 230 (preferably the "Motive" product), receive the back annotation file (.idd), the netlist pin file (.pin), the compiled model file (.mod), and the clock reference file (.ref), and operate to analyse the circuit. In a preferred embodiment, the circuit design tools 230 operate interactively with the designer or other user to provide information about the circuit and other forms of analysis to the designer or other user.

Figure 6:
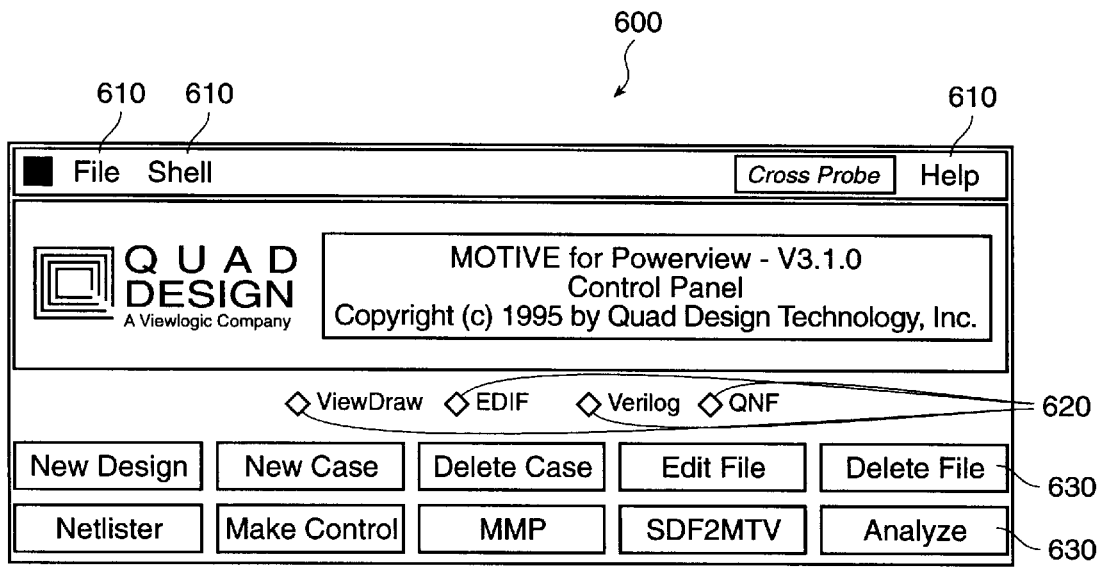
FIG. 6 shows a display of a control panel for automated circuit design case management.

FIG. 6 shows a display of a control panel for automated circuit design case management.

A control panel 600 for automated circuit design case management using the case management module 220 comprises a window having a set of pulldown menus 610, a set of radio buttons 620, and a set of command buttons 630.

The pulldown menus 610 comprise a file pulldown menu, from which file commands may be accessed, a shell pulldown menu, from which shell commands may be accessed, and a help pulldown menu, from which help commands may be accessed. Pulldown menus are known in the art of window-based user interfaces, so a detailed description of the operation of these particular pulldown menus is not necessary.

The file pulldown menu comprises a set of file-based and other commands, preferably those found in table 6-1.

TABLE 6–1

| Command | Purpose |
| --- | --- |
| Save Parameters | save parameters used by the case management module |
| Setup Environment | define or alter environment variables used by the case management module |
| Setup Preferences | define or alter user preferences used by the case management module |
| Browse Cases | display cases for selection |
| Open Xterm | open an additional window for display or manipulation of cases |
| Quit | exit the case management module and return to calling process |

The shell pulldown menu comprises at least one selection for starting a new Unix shell, for issuing file commands and other commands directly to the operating system.

The help pulldown menu comprises at least one selection for accessing manual pages or other help topics for each one of the tools available using the circuit design tool engine.

The set of radio buttons 620 comprise one button for each data format, so as to indicate to the model preprocessor 210 which format translator module 310 should be invoked and which process flow should be followed. In a preferred embodiment, there is one radio button 620 each for the ViewDraw format, the EDIF format (.edf), the Verilog format (.v), and the QNF format (.qnf).

The set of command buttons 630 comprises a set of commands for use by the designer or other user, such as those found in table 6-2.

TABLE 6–2

| Button | Purpose |
| --- | --- |
| New Design | create or select a new design |
| New Case | create or select a new case for a design |
| Delete Case | delete a case |
| Edit File | edit a file using an appropriate editing tool |
| Delete File | delete a file |
| Netlister | invoke the VTM module to generate the netlist pin file (.pin) |
| Make Control | invoke the MAKECTL module to generate the MMP control file (.ctl) |
| MMP | invoke the MMP module to generate the compiled model file (.mod) |
| SDF2MTV | invoke the SDF2MTV format translator to generate the back annotation file (.idd) |
| Analyze | invoke the circuit design tool engine to perform analysis functions |

In a preferred embodiment, the case management module 220 comprises an option for determining whether pulldown menus 610 or command buttons 630 are preferred. When pulldown menus 610 are preferred, more options are presented to the designer or other user using pulldown menus; when command buttons 630 are preferred, more options are presented to the designer or other user using command buttons.

Figure 7:
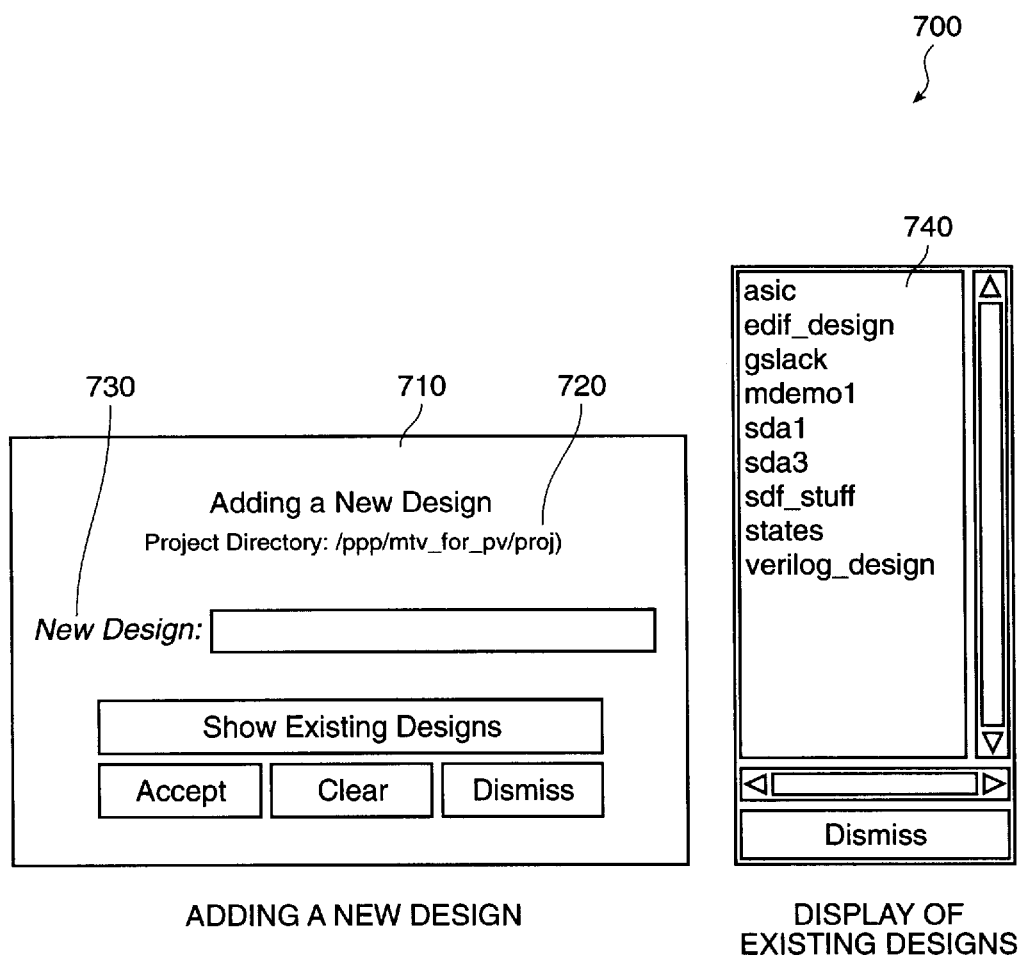
FIG. 7 shows a display for selecting a new design.

FIG. 7 shows a display for selecting a new design.

A display 700 for selecting a new design using the case management module 220 comprises a first window 710, titled "Adding a New Design", having a project directory display 720, a new design entry box 730, and a set of command buttons, including one command button to show existing designs, one to accept the new design, one to clear the new design entry box 730, and one to dismiss the first window 710 for adding a new design. The designer or other user may enter a name for a new design using the new design entry box 730, accept that new name, clear the new name and try again, or dismiss the first window 710 for adding a new design and thus abort the step of adding a new design. Command buttons for "accept", "clear" and "dismiss" are known in the art of windowing systems.

The designer or other user enters a name for the new design. Before accepting that name, the designer or other user may also choose to show existing designs, in which event a second window 740 is displayed, having a list of existing designs, with scroll bars and its own dismiss command button.

FIG. 8 shows a display for selecting a new case.

A display 800 for selecting a new case using the case management module 220 comprises a first window 810, titled "Adding a New Case", having the project directory display 720, a design selection box 830, a new case entry box 840, a set of new case type radio buttons 850, a from-design selection box 860, a from-case selection box 870, and a set of command buttons, including one command button to select a design, one to select a source design, one to accept the new case, one to clear the new case entry box 840, and one to dismiss the first window 810 for adding a new case.

The designer or other user may enter a name for an existing design for the new case (the new case is a version of an existing design), or may select an existing design using the command button therefor. In the latter event, a second window 880 is displayed, having a list of existing designs, with scroll bars and its own dismiss command button.

The designer or other user enters a name for a new case.

When adding a new case, the designer or other user selects whether the new case will be constructed from default new case files, or from copying an existing case, using the new case type radio buttons 850.

If the designer or other user chooses that the new case will be copied from an old case, the designer or other user selects a name for an existing design, and an existing case within that design, from which the new case will be copied. The designer or other user may enter a name for an existing source design and a name for an existing source case, or may select an existing design using the command button therefor. In the latter event, the second window 880 is displayed, having a list of existing designs, with scroll bars and its own dismiss command button.

If the designer or other user chooses that the new case will be copied from an old case, a third window 890 is displayed, having a list of files which may be copied or linked from the source design and case, with scroll bars, its own dismiss command button, and a copy-all command button to indicate that all such files will be copied (or linked).

If the designer or other user chooses that the new case will be copied from an old case, and that one or more files will be linked rather than copied, the case management module 220 generates one or more corresponding links between the source case and the new case, indicating that the new case is using the same file as the source case. Thereafter, when changes are made to the file, those changes are reflected in both cases at once.

FIG. 9 shows a display for deleting a design or a case.

A display 900 for deleting a design or a case using the case management module 220 comprises a first window 910, titled "Deleting", having the project directory display 720, a design selection box 930, a case selection box 940, and a set of command buttons, including one command button to clear the design selection box 930 and the case selection box 940, one to select a design, one to delete the selected design, one to delete the selected case, and one to dismiss the first window 910 for deleting.

The designer or other user may enter a name for an existing design, or may select an existing design using the command button therefor. In the latter event, a second window 950 is displayed, having a list of existing designs, with scroll bars and its own dismiss command button.

Similarly, the designer or other user may enter a name for an existing case for the selected design, or may select an existing case for the selected design using the command button therefor. In the latter event, a third window 960 is displayed, having a list of existing cases for the selected design, with scroll bars and its own dismiss command button.

Display for the VTM module 320, invoked by the "Netlister" command button 630, takes on a different format for each input data format, as selected by the radio buttons 620.

FIG. 10 shows a display for a netlister tool for ViewDraw data.

A display 1000 for the VTM module 320 used with ViewDraw format comprises the project directory display 720, a design name box 1010, having reset and clear command buttons, a case name box 1020 for a case for that design, also having reset and clear command buttons, and a first set of radio buttons 1030 for designating whether output is to a file relative to the case or to an explicit location specified by the designer or other user.

The display 1000 also comprises a second set of radio buttons 1040, which designate which output files to generate.

The display 1000 also comprises a set of options boxes 1050, each having reset and clear command buttons, which allow the designer or other user to specify command options and other options for the VTM module 320. Where an indicated option comprises a file name, select and browse command buttons are provided to allow the designer or other user to examine a directory tree of possible file names, and to select one such file name as the indicated option.

The display 1000 also comprises a set of window command buttons 1060, including one to accept the indicated options, one to initialize the indicated options to a known default set of options, one to clear all entries, one to dismiss the display 1000 and thus abort the operation, and one to select a new design.

FIG. 11 shows a display for a netlister tool for EDIF data. The display 1100 has similar elements as the display 1000 for the ViewDraw format, except that particular elements for options for the EDIF format (.edf) are included.

FIG. 12 shows a display for a netlister tool for Verilog data.

The display 1200 has similar elements as the display 1000 for the ViewDraw format, except that particular elements for options for the Verilog format (.v) are included. In particular, the display 1200 comprises options for renaming output files generated in support of the Verilog format (.v), after they have been created and after the appropriate data operation is complete.

FIG. 13 shows a display for a netlister tool for QNF data.

The display 1300 has similar elements as the display 1000 for the ViewDraw format, except that particular elements for options for the QNF format (.qnf) are included.

Figure 14:
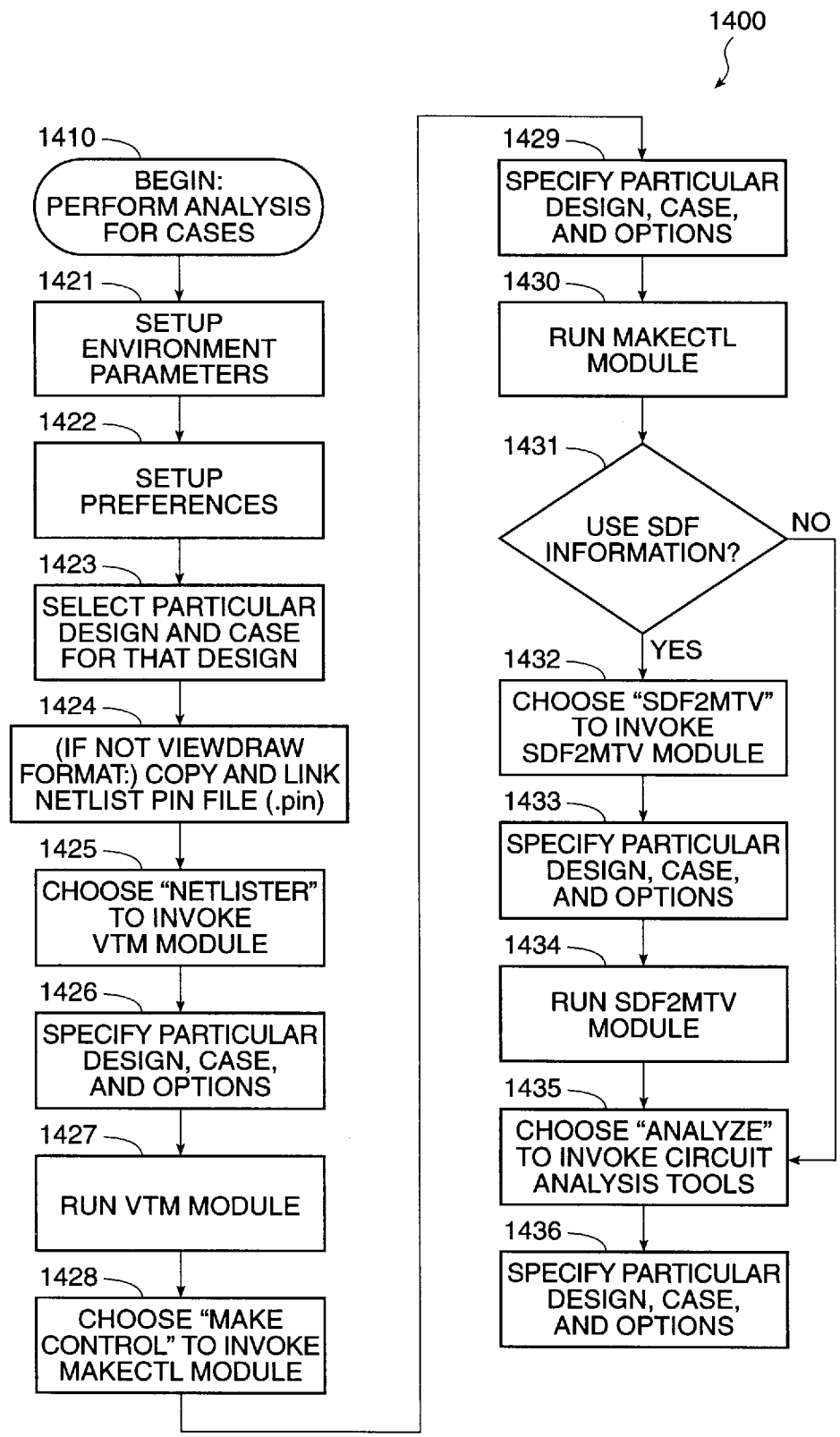
FIG. 14 shows a process flow diagram of a sample work session using the system for automated circuit design case management.

FIG. 14 shows a process flow diagram of a sample work session using the system for automated circuit design case management.

A method 1400 is performed by the model preprocessor 210, the case management module 220, and the circuit design tools 230, as operated by a designer or other user.

At a flow point 1410, the designer or other user desires to perform analysis for particular cases for particular designs.

At a step 1421, the designer or other user chooses the "Setup Environment" entry from the file pulldown menu of the pulldown menus 610 of the control panel 600, and uses the tools therein to setup environment parameters.

At a step 1422, the designer or other user chooses the "Setup Preferences" entry from the file pulldown menu of the pulldown menus 610 of the control panel 600, and uses the tools therein to setup preferences.

At a step 1423, the designer or other user chooses the "Browse Cases" entry from the file pulldown menu of the pulldown menus 610 of the control panel 600, and uses the tools therein to select a particular case for a particular design for analysis. If necessary, the designer or other user may choose "New Design" from the command buttons 630 to create a new design or may choose "New Case" from the from the command buttons 630 to create a new case.

At a step 1424, if the netlist input format is other than the ViewDraw format, the designer or other user chooses the "Browse Cases" entry from the file pulldown menu of the pulldown menus 610 of the control panel 600, and uses the tools therein to copy or link the proper netlist pin file (.pin) to the case subdirectory 130.

At a step 1425, the the designer or other user chooses the "Netlister" command button 630 to prepare to invoke the VTM module 320 to generate the netlist pin file (.pin).

At a step 1426, the designer or other user specifies the particular design, the particular case for that design, and particular options for invoking the VTM module 320.

At a step 1427, the designer or other user uses the "accept" command button to invoke the VTM module 320 with the selected options, waits for translation to complete, and then uses the "dismiss" command button to dismiss the window 1000.

At a step 1428, the designer or other user chooses the "Make Control" command button 630 to prepare to invoke the MAKECTL module 510 to generate the MMP control file (.ctl).

At a step 1429, the designer or other user specifies the particular design, the particular case for that design, and particular options for invoking the MAKECTL module 510.

At a step 1430, the designer or other user uses the "accept" command button to invoke the MAKECTL module 510 with the selected options, waits for translation to complete, and then uses the "dismiss" command button to dismiss the window.

At a step 1431, the designer or other user determines whether to use data in the SDF format (.sdf). If so, the method continues with the step 1432. Otherwise, the method continues with the step 1435.

At a step 1432, the designer or other user chooses the "SDF2MTV" command button 630 to prepare to invoke the SDF2MTV module of the format translator modules 310.

At a step 1433, the designer or other user specifies the particular design, the particular case for that design, and particular options for invoking the SDF2MTV module of the format translator modules 310.

At a step 1434, the designer or other user uses the "accept" command button to invoke the SDF2MTV module of the format translator modules 310 with the selected options, waits for translation to complete, and then uses the "dismiss" command button to dismiss the window.

At a step 1435, the designer or other user chooses the "Analyse" command button 630 to prepare to invoke the circuit design tools 230.

At a step 1436, the designer or other user specifies the particular design and the particular case for that design for analysis using the circuit design tools 230.

Alternative Embodiments

Although preferred embodiments are disclosed herein, many variations are possible which remain within the concept, scope, and spirit of the invention, and these variations would become clear to those skilled in the art after perusal of this application.

I claim:

1. A system for managing files used by a timing analysis tool, the timing analysis tool responsive to a set of timing files, a set of input files, and a batch command file, said system including:
    a plurality of cases, each said case for defining a case flow for the timing analysis tool and including a plurality of timing files in a format suitable for use by the timing analysis tool;
    a plurality of circuit designs, each said circuit design including a set of information files;
    a tool for reading information associated with a first case and for creating a second case responsive to said information, said second case including a first subset of timing files which are each identical to a corresponding first subset of timing files for said first case, and said second case including a second subset of timing files which differ from a corresponding second subset of timing files for said first case,
    wherein said tool includes a case management module adapted for generating the batch command file and a model preprocessor adapted for receiving said set of information files which are associated with a case to be processed and for generating the set of input files from said set of information files, said model preprocessor including a set of format translator modules for translating said set of information files to the input files; and
    a set of links linking said first subset of timing files from said first case and said first subset of timing files from said second case, said set of links enabling said tool to update said second set of timing files in said second case by updating said first set of timing files in said first case.

2. A system as in claim 1, wherein said set of information files include a circuit schematic, a symbolic representation for a circuit element, a set of timing information, or a wiring diagram.

3. The system as in claim 1, further including a tool for modification of one of said first subset of said first and second cases, said tool for modification responsive to said set of links.

4. The system as in claim 1, further including a timing analysis tool for timing verification of a first case, said timing analysis tool responsive to a set of timing files, a set of input files, said set of link and a batch command file.

5. A method for managing files used by a timing analysis tool, said method including:
    storing a plurality of cases, said step of storing including the steps of storing, for each said case, a plurality of timing files and a plurality of circuit designs, each said circuit design including a set of information files;
    responsive to an external input, reading information associated with a first case and creating a second case responsive to said information, said step of creating a second case including the step of creating a first subset of timing files which are each identical to a corresponding first subset of timing files for said first case, and said step of creating a second case including the step of creating a second subset of timing files which differ from a corresponding second subset of timing files for said first case;
    generating a batch command file to which a timing analysis tool is responsive, said batch command file for manipulating said timing files;
    receiving said set of information files which are associated with a case to be processed;
    generating a set of input files from said set of information files by translating said set of information files to a format suitable for use by a timing analysis tool; and linking said first subset of files from said first case and said first subset of files from said second case, said set of links enabling said tool to update said second set of timing files in said second case by updating said first set of timing files in said first case.

6. The method as in claim 5, wherein said external input comprises a user command.

7. The method as in claim 5, wherein said step of storing said plurality of circuit designs includes the step of storing a circuit schematic, a symbolic representation for a circuit element, a set of timing information, or a wiring diagram.

8. The method as in claim 5, further including the step of responsive to a second external input, invoking a timing analysis tool for analyzing one of a plurality of cases, said step of invoking being responsive to said timing files, a set of input files, said set of links, and a batch command file.

9. The method as in claim 8, wherein said second external input comprises a user command.

10. The method as in claim 5, further including the step of, responsive to a third external input, invoking a program for modifying one of a plurality of cases, said step of invoking being responsive to said timing files, a set of input files, said set of links, and a batch command file.

11. The method as in claim 10, wherein said third external input comprises a user command.

12. The method as in claim 5, further including the step of, responsive to a fourth external input, invoking a program for verifying a first case, said step of invoking being responsive to said timing files, a set of input files, said set of links, and a batch command file.

13. The method as in claim 12, wherein said fourth external input comprises a user command.

14. The method according to claim 5, wherein the step of receiving information files further includes the following sub-steps:

receiving a set of schematic wire files;

receiving a set of primitive control files;

receiving a set of timing files;

receiving a set of library files;

receiving a set of technology files; and receiving a set of model templates.

15. The method according to claim 5, wherein the step of generating a set of input files further includes the following sub-steps:

generating an error log file;

generating a wave-form file; and generating a back annotation file, a netlist pin file, and a compiled model file.

16. The method according to claim 5, further including a step of providing to said timing analysis tool a Boolean states information file;

a run-time parameters file;

a multi-cycle paths file;

a component placement file; and a clock reference file.

17. The method according to claim 5, further including a step of generating a set of output files by:

generating a path trace log;

generating an output report;

generating a global slack report; and generating an extracted timing model file.

18. A system for managing case flows for a timing analysis tool, comprising:

a timing analysis tool;

a plurality of cases each said case for defining a case flow for said timing analysis tool and including a plurality of timing files in a format suitable for use by said timing analysis tool;

a plurality of circuit designs, each said circuit design including a set of information files;

a model preprocessor for receiving a set of information files associated with a case flow to be processed and for generating said set of input files using said set of information files;

a set of links linking a first subset of timing files from said first case and said first subset of timing files from a second case, said set of links enabling said timing analysis tool to update said first set of timing files in said second case by updating said first set of timing files in said first case, said first case including a second subset of files which are different from a second subset of files in said second case;

a case management module for generating said set of batch commands; and wherein, said timing analysis tool generates at least one output file in response to said set of timing files, said set of input files, said set of links, and said batch command file.

19. The system according to claim 18, wherein said model preprocessor further includes a set of format translator modules for translating said set of information files into a standardized format for use by said timing analysis tool.

20. The system according to claim 19, wherein said set of format translator modules includes:

an SDF2MTV module for translating from an SDF format;

an EEDIF module for translating from an EDIF format;

a VTRAN module for translating from a Verilog format; and a QNF2PIN module for translating from a QNF format.

21. The system according to claim 19, wherein said model preprocessor further includes a VTM module for receiving said set of information files, including schematic wire files, timing files, and primitive control files, said VTM module adapted for generating a back annotation file, a netlist pin file, and an MMP control file when used with one or more of the set of format translator modules.

22. The system according to claim 18, wherein said case management module further includes an MMP module for receiving library files, technology files, model templates, and an MMP control file, said MMP module adapted for generating said batch command file and a compiled model file.

23. The system according to claim 19, wherein said model preprocessor further includes a VTM module for receiving said set of information files, including schematic wire files, symbol table files, schematic files, and timing files, said VTM module adapted for generating a back annotation file, a netlist pin file, model templates, and an MMP control file when used with one or more of said set of format translator modules and when processing data in ViewDraw format.

24. A method for providing an automated management of case flows for a timing analysis tool, comprising:

a plurality of cases, each said case for defining a case flow for the timing analysis tool and including a plurality of timing files in a format suitable for use by the timing analysis tool;

a set of links linking a first subset of timing files from a first case and a first subset of timing files from a second case, said set of links enabling the timing analysis tool to update said first set of timing files in said second case by updating said first set of timing files in said first case, including a second subset of files which are different from a second subset of files in said second case;

providing a model preprocessor for receiving a set of information files associated with a case to be processed and for generating a set of files to be passed to the timing analysis tool; and providing a case management module for generating a set of batch commands for manipulating said timing files, the timing analysis tool responsive to said set of batch commands.

25. The method according to claim 24, wherein the model preprocessor providing step further includes a sub-step of:

providing a set of format translator modules for translating the set of information files into a standardized format for use by said timing analysis tool.

26. The method according to claim 25, wherein the model preprocessor providing step further includes the following sub-steps:

receiving schematic wire files, symbol table files, schematic files, and timing files; and generating a netlist pin file.

27. The method according to claim 26, the method further including a sub-step of generating a back annotation file.

28. The method according to claim 27, the method further including a sub-step of generating model templates.

29. The method according to claim 28, the method further including a sub-step of generating an MMP control file.

30. The method according to claim 29, the method further including the following sub-steps:

producing an MMP source file;

receiving an MMP control file and the MMP source file; and generating a compiled model file in response to the MMP source file and the MMP control file.

31. The method according to claim 30, the method further including the following sub-steps:

creating a clock reference file; and receiving the back annotation file, the netlist pin file, the compiled model file, and the clock reference file.

32. The method according to claim 30, the method further including the sub-step of editing the model templates.

* * * * *

UNITED STATES PATENT AND TRADEMARK OFFICE
CERTIFICATE OF CORRECTION

PATENT NO.   : 5,850,348
DATED        : December 15, 1998
INVENTOR(S)  : Charles Berman It is certified that error appears in the above-identified patent and that said Letters Patent is hereby corrected as shown below:

On column 5, line 1, replace "analyse" with --analyze--.

On column 5, line 15, after "receives" insert --and--.

On column 5, line 29, replace "analyse" with --analyze--.

On column 9, line 53, replace "Analyse" with --Analyze--.

On column 9, line 4, delete "from the".

On column 10, line 42, replace "link" with --links--.

On column 13, line 4, before "including" insert --said first case--.

Signed and Sealed this

Eighth Day of February, 2000

Attest:

Attesting Officer

Q. TODD DICKINSON

*Commissioner of Patents and Trademarks*